3,372,452
SECURING OF SLEEVES IN CYLINDER BORES
Donald Firth, Roger Harvey Yorke Hancock, and
William Balfour, East Kilbride, Glasgow, Scotland, assignors to Minister of Technology, London, England, a corporation
Filed Sept. 15, 1965, Ser. No. 487,543
Claims priority, application Great Britain, Sept. 25, 1964, 39,065/64
9 Claims. (Cl. 29—156.4)

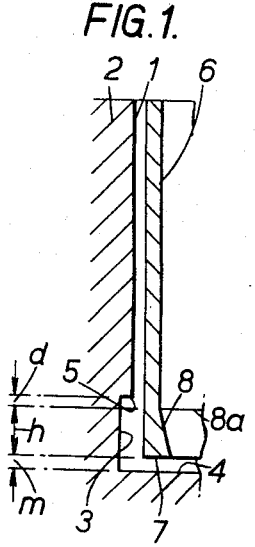
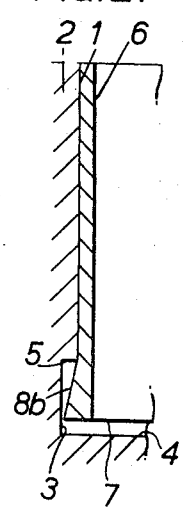
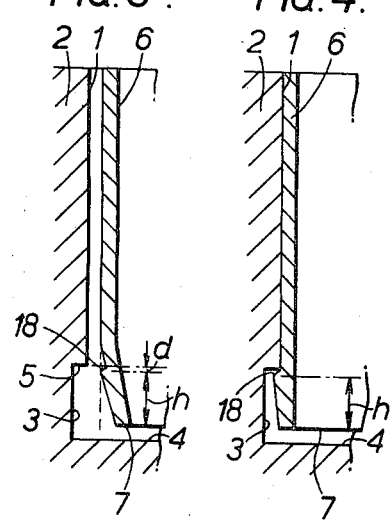
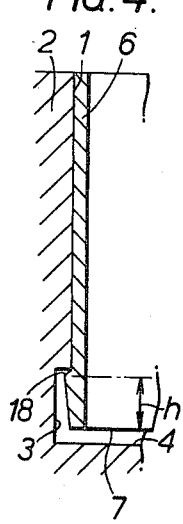
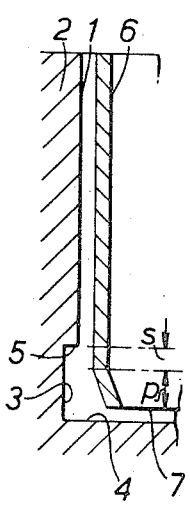
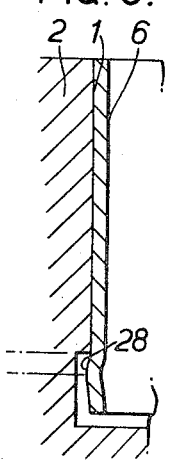
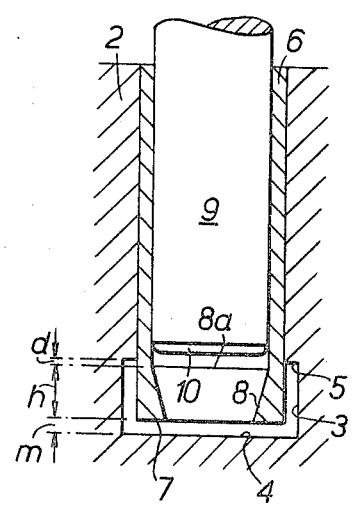

This invention relates to the securing of sleeves in cylinder bores as frequently found, for example, in internal combustion engines, axial piston swash plate machines, and ball pumps and motors.

Hitherto it has been customary to secure plain cylindrical sleeves in plain cylinder bores by making them a shrink fit, but this method is sometimes ineffective by itself, and such a shrunk-in sleeve may work loose.

It has already been proposed, in the specification of United States Patent No. 3,187,681 to enlarge the inner ends of both the cylinder bore and the sleeve so as to form interengageable shoulders on these parts, the external shoulder on the sleeve being of a height which does not prevent assembly of the sleeve in the bore by the conventional shrink fit method.

According to the present invention, an interlocked shoulder effect in the finished assembly is achieved by providing the cylinder bore at its inner end with a shallow annular groove or recess, and inwardly deforming the corresponding end of the sleeve—as by increasing the wall thickness or by inward deformation or enlargement—in such a way that, after the sleeve has been fully introduced into the cylinder bore, the deformed end of the sleeve overlaps the annular recess. As will be understood, the sleeve is initially cooled and the cylinder block is heated during this step. When the sleeve has been shrunk into the bore, a blunt-nosed cylindrical punch can be introduced as a close sliding fit into the sleeve and forced through to the inner end thereof, thereby expanding the deformed recess-overlapping end outwards into the annular recess. By correctly proportioning the deformation at the inner end of the sleeve, the expanded portion which, after shrink fitting of the sleeve in the bore, overlaps the recess and forms an external upset or shoulder which positively interlocks with the step or shoulder between the annular recess and the main part of the bore.

The internal deformation must not be of greater axial length than the corresponding dimension (width) of the annular recess, so that the metal of the sleeve in the part which overlaps the recess is free to deform radially outwards into the clearance space provided by the recess. Preferably, the wall thickness of the sleeve is increased progressively over this overlap length, so that the finally expanded sleeve portion presents an internally coned surface lying in the recess. Since this overlapping part of the sleeve is not subjected to any of the radial compression exerted on the remainder by the rest of the cylinder bore, a positive lock is formed to resist extraction of the sleeve.

Alternatively, the part of the sleeve which will overlap the annular recess can be initially formed with a shallow external step, this stepped end then being inwardly deformed by swaging, or by passage through a die of a diameter not greater than that of the cylinder bore, so that the whole sleeve can be passed down the cylinder bore while the latter is expanded in diameter under heat and the sleeve itself shrunk in external diameter by cooling, in the conventional manner of assembling a shrink-fit sleeve. When thermal equilibrium has been established, the punch re-expands the stepped inner end of the sleeve into the recess.

In another alternative arrangement, the sleeve is initially formed with constant wall thickness, and that length at its inner end which will overlap the recess is internally slightly upset or coned to reduce its internal diameter at the inner end. After the sleeve has been shrunk in, the punch is forced in to restore the internal diameter of the sleeve, and in so doing causes an external kink or shoulder to be formed on the sleeve at the junction of the annular recess and the main part of the cylinder bore.

In order to ensure proper interengagement of the punch and the inwardly deformed portion at the inner end of the sleeve, it is preferred that the annular recess in the cylinder bore be made of sufficiently greater width (measured axially) than the length of the corresponding overlap portion of the sleeve to provide a small axial clearance between the inner ends of the sleeve and the cylinder bore. In this way it can be ensured both that the expansion of th sleeve end by the punch will not be hindered by friction against the end wall of the cylinder bore, and that the punch can be passed fully into the sleeve. The necessary axial location of the sleeve can be controlled by an appropriate gauging means, as will be understood.

In most cases, it will be necessary or desirable to finish machine the bore of the sleeve.

Practical embodiments of the present invention will now be particularly described, by way of example only, with reference to the accompanying schematic drawings, in which all clearances, angles and other pertinent dimensions are deliberately exaggerated to illustrate the essential features of the invention. In the drawings:

FIGURE 1 is a fragmentary axial section through a cylinder bore and a first form of sleeve prior to shrinkage of the former and expansion of the latter;

FIGURE 2 is a section similar to FIGURE 1 after final expansion of the sleeve by the punch;

FIGURES 3 and 4 and FIGURES 5 and 6 are pairs of views similar to FIGURES 1 and 2 showing modified forms of sleeve, and FIGURE 7 is a full section corresponding to FIGURE 1 showing a punch about to expand the inwardly enlarged overlapping inner end of a sleeve.

FIGURE 7 can be taken as typical of the step of locking any of the three forms of sleeve in position.

Referring first to FIGURES 1 and 2 of the drawings, the bore 1 of a cylinder in a cylinder block 2 is parallel for most of its length, but a short section 3 adjacent its inner end 4 is relieved to form an annular groove or recess bounded by the end wall 4 of the cylinder and an internal shoulder 5.

A sleeve 6 to be shrunk into the cylinder bore 1 has a plain cylindrical external surface and a constant wall thickness over most of its length. Adjacent its inner end 7, however, it is progressively thickened as shown at 8 (see also FIGURE 7). The length $h$ of this thickened section 8 is such that, when the sleeve 6 is inserted into the bore 1, it overlaps the recess 3 so that the root 8a thereof lies just inside the shoulder 5, as indicated by the positive distance $d$ in FIGURE 7, whilst the inner end 7 of the sleeve is clear of the end wall 4 of the bore 1 by a small amount $m$. The distance $d$ must never be negative, and this can be ensured by machining the groove or recess 3 so that the shoulder 5 lies at a fixed distance axially from the outer face of the cylinder block 2. The sleeve 6 can then be correctly positioned by pressing it home by means of a flat bolster or pad which engages the rim of the bore 1 and thus leaves the outer end of the sleeve 6 flush with the outer face of the cylinder block 2. The position of the line 8a and the overlap length $h$ can then be determined.

After assembly of the sleeve 6 in the bore 1 as described above, the block 2 and sleeve 6 are allowed to come to an equilibrium temperature when the sleeve is gripped by the block in radial compression. A punch 9

(FIGURE 7) having an external diameter such that it is a good sliding fit in the sleeve is forced in until its nose 10 meets the end wall 4 of the cylinder bore. As the nose end 10 of the punch passes through the internally thickened section 8 of the sleeve, the latter is expanded to present an external thickening 8b (FIGURE 2) whose outer diameter is progressively greater than the diameter of the bore 1 outwards from the shoulder 5, and hence a positive lock is formed between the sleeve 6 and the shoulder 5. Moreover, the overlap section h is not radially compressed by thermal contraction of the block 2. The sleeve 6 may be finish machined after withdrawal of the punch 9 if desired.

FIGURES 3 and 4 show an alternative arrangement in which the overlap section h of the sleeve is initially formed with an external step 18. The sleeve may be of constant increased wall thickness between this step and the inner end 7, or may be tapered down to the normal wall thickness at the inner end 7, as shown. Before introducing the sleeve 6 into the bore 1, the stepped overlap section h is externally swaged or sized in a die to reduce the external diameter over the step 18 to the same value as the main cylindrical portion of the sleeve, as shown in FIGURE 3. After introduction of the sleeve into the bore 1 and shrinking, the punch 9 is forced in to expand the stepped section and cause the step 18 to interlock with the bore shoulder 5 (FIGURE 4).

In a further modification shown in FIGURES 5 and 6, the wall thickness of the sleeve 6 is kept constant, and the inner end is constantly deformed or coned over an axial length p less than the corresponding overlap length h in FIGURES 1-4 by a small amount s such that, on introduction of the punch 9, an external kink or shoulder 28 is upset in contact with the bore shoulder 5.

For the purposes of the present specification, the term "deformation" as applied to the overlap portion of the sleeve is deemed to include any mechanical or physical process for producing, prior to the shrinking in of the sleeve into the bore, a reduction in the internal diameter of the sleeve of such magnitude and extent as will result in the required radial expansion of the sleeve into the annular recess in the cylinder bore after the shrink fitting step by the insertion and passage therethrough of a cylindrical punch which is a close sliding fit in the mouth of the sleeve.

We claim:

1. The method of shrink fitting a sleeve in a cylinder bore comprising the steps of forming an annular recess in the wall of the bore at the inner end thereof; producing a sleeve of a length such that its inner end will overlap said annular recess when correctly assembled in said bore; radially inwardly deforming the wall of the sleeve at the zone of overlap of said annular recess while maintaining the external diameter at a value not greater than that of the remainder of the sleeve; shrink fitting the sleeve in the bore, and forcing a cylindrical punch as a close sliding fit through the shrunk-in sleeve to expand the overlap portion of the sleeve into the annular recess.

2. The method of shrink fitting a sleeve in a cylinder bore comprising the steps of forming an annular recess in the wall of the bore at the inner end thereof; producing a sleeve of a length such that its inner end will overlap said annular recess when correctly assembled in said bore; increasing the wall thickness of the sleeve at the zone of overlap of said annular recess while maintaining the external diameter at a value not greater than that of the remainder of the sleeve; shrink fitting the sleeve in the bore, and forcing a cylindrical punch as a close sliding fit through the shrunk-in sleeve to expand the overlap portion of the sleeve into the annular recess.

3. The method according to claim 2 wherein the wall thickness is increased externally, and the sleeve is sized prior to shrink fitting in the bore to reduce its overall diameter at least to the value of the external diameter of the remainder of the sleeve.

4. The method of shrink fitting a sleeve in a cylinder bore comprising the steps of forming an annular recess in the wall of the bore at the inner end thereof; producing a sleeve of a length such that its inner end will overlap said annular recess when correctly assembled in said bore; progressively increasing the wall thickness of the sleeve towards its inner end for a distance adjacent not greater than the axial length of the overlap portion of the sleeve while maintaining the external diameter of said portion at a value not greater than that of the remainder of the sleeve; shrink fitting the sleeve in the bore, and forcing a cylindrical punch as a close sliding fit through the shrunk-in sleeve to expand the portion of increasing wall thickness into the annular recess.

5. The method of shrink fitting a sleeve in a cylinder bore comprising the steps of forming an annular recess in the wall of the bore at the inner end thereof; producing a sleeve of a length such that its inner end will overlap said annular recess when correctly assembled in said bore; inwardly coning the inner end of the sleeve for a distance slightly less than the length of the overlap portion of the sleeve; shrink fitting the sleeve in the bore, and forcing a cylindrical punch as a close sliding fit through the shrunk-in sleeve to expand the inwardly coned portion into the annular recess.

6. The method of sleeving a cylinder bore comprising forming a shallow annular recess around the bore wall at the inner end of the cylinder; producing a sleeve of a size to be a shrink fit in the smaller diameter section of the bore and to axially overlap the junction of the said section and the recess; inwardly deforming the internal wall of the sleeve from the inner end thereof for a length not greater than the length of the overlap of the recess; shrink fitting the sleeve in the bore and expanding the inwardly deformed portion into the annular recess by the insertion of a cylindrical punch which is a close sliding fit in the outer end of the sleeve.

7. In the process of shrink fitting a sleeve in a cylinder bore having an annular recess at its inner end, producing a sleeve having an inward deformation at the inner end prior to shrinking into the bore, shrink fitting said sleeve into said bore, and expanding the deformed inner end, after shrinking, into the recess in the bore by passing a close fitting punch through the sleeve.

8. In the process as claimed in claim 7, the formation of an external shoulder around the sleeve at a point which will, after shrinking in of the sleeve, register with the recess, and sizing the shouldered part of the sleeve down to the external diameter of the remainder prior to shrinking the sleeve into the bore.

9. The method of shrink fitting a sleeve into a cylinder bore wherein the said bore is first relieved at its inner end by an annular recess and the sleeve is initially formed of a length to overlap the recess with slight positive clearance from the inner end wall of the bore, the method further comprising the steps of inwardly deforming the recess-overlapping end of the sleeve, shrink fitting the sleeve into the bore, and passing through the shrunk-in sleeve a cylindrical punch which is a close sliding fit in the mouth of the sleeve so as to expand the deformed portion into the annular recess.

References Cited

UNITED STATES PATENTS

| | | |
|---|---|---|
| 1,081,257 | 12/1913 | Sprado. |
| 1,832,954 | 11/1931 | Weatherhead. |
| 2,903,309 | 9/1959 | Brand. |
| 3,094,773 | 6/1963 | Bukoff. |
| 3,090,114 | 5/1963 | Sinclair _____ 29—447 |
| 3,241,226 | 3/1966 | Jorgji. |

FOREIGN PATENTS 454,210    9/1936    Great Britain.

CHARLIE T. MOON, *Primary Examiner.*